United States Patent [19]

Hahn et al.

[11] Patent Number: 4,886,880

[45] Date of Patent: Dec. 12, 1989

[54] PROCESS FOR THE PREPARATION OF TRIPHENDIOXAZINES

[75] Inventors: Holger Hahn, Grenzach-Wyhlen; Rudolf Blattner, Rheinfelden, both of Fed. Rep. of Germany

[73] Assignee: Ciba-Geigy Corporation, Ardsley, N.Y.

[21] Appl. No.: 212,534

[22] Filed: Jun. 28, 1988

[30] Foreign Application Priority Data

Jul. 7, 1987 [CA] Canada .................................. 2579/87

[51] Int. Cl.$^4$ ............................................ C07D 498/04
[52] U.S. Cl. ........................................ 544/76; 544/75; 544/77
[58] Field of Search ............................... 544/75, 76, 77

[56] References Cited

U.S. PATENT DOCUMENTS

| | | | |
|---|---|---|---|
| 3,883,523 | 5/1975 | Parton | 260/246 R |
| 3,892,742 | 7/1975 | Parton | 260/246 R |
| 3,996,221 | 12/1976 | Leng et al. | 260/246 R |
| 4,532,323 | 7/1985 | Jäger | 544/75 |
| 4,577,015 | 3/1986 | Jäger et al. | 544/76 |
| 4,604,459 | 8/1986 | Jäger | 544/76 |

FOREIGN PATENT DOCUMENTS

| | | |
|---|---|---|
| 616661 | 8/1935 | Fed. Rep. of Germany . |
| 1024652 | 2/1958 | Fed. Rep. of Germany . |
| 3339923 | 5/1985 | Fed. Rep. of Germany . |
| 308489 | 9/1955 | Switzerland . |
| 308490 | 9/1955 | Switzerland . |
| 457555 | 11/1936 | United Kingdom . |
| 1353604 | 5/1974 | United Kingdom . |
| 1368158 | 9/1974 | United Kingdom . |
| 1559752 | 1/1980 | United Kingdom . |
| 1589915 | 5/1981 | United Kingdom . |

OTHER PUBLICATIONS

C.A. 106:6429a, (1987).
C.A. 100:211658s, (1984).

*Primary Examiner*—Richard L. Raymond
*Attorney, Agent, or Firm*—Kevin T. Mansfield; Edward McC. Roberts

[57] ABSTRACT

A process for the preparation of triphendioxazines of oxidising cyclisation of 2,5-diarylamino-1,4-benzoquinones with oleum and further optional oxidising agents and/or catalysts, which process comprises charging a reactor simultaneously with the 2,5 diarylamino-1,4-benzoquinone and oleum.

13 Claims, No Drawings

PROCESS FOR THE PREPARATION OF TRIPHENDIOXAZINES

The present invention relates to an improved process for the preparation of triphendioxazines by oxidising cyclisation of 2,5-diarylamino-1,4-benzoquinones with oleum and further optional oxidising agents and/or catalysts, which process comprises charging a reactor simultaneously with the 2,5-diarylamino-1,4-benzoquinone and oleum.

Triphendioxazines are important dyes and intermediates for the synthesis of dyes.

It has long been known that compounds of this type can be converted into triphendioxazines by heating diarylaminobenzoquinones of formula

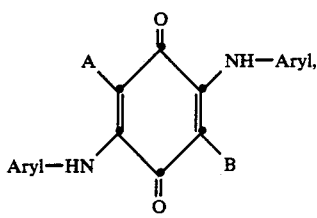
(I)

wherein A and B have the meanings given below and aryl is unsubstituted or substituted, in sulfuric acid or oleum using $SO_3$ as oxidising agent, with the optional addition of further oxidising agents. In this connection, the following publications are cited by way of references: UK patents 457 555 and 1 589 915, Swiss patents 308 489 and 308 490, German patent 616 661, German Auslegeschrift 1 024 652, German Offenlegungsschrift specifications 2 122 262, 2 124 080, 2 302 382, 2 344 781, 2 503 611, 2 823 828, 3 423 581, 3 510 613, and European patent specifications A-101 665 and A-153 599.

Common to all these processes is that either the diarylaminobenzoquinone is added to the oxidising agent present in the reactor or, conversely, that the oxidising agent is added to the quinone. In this procedure, there is the danger of undesirable side-reactions, especially if oleum of higher concentration is employed, so that it is necessary to carry out the reaction in a fairly dilute reaction medium, i.e. with large amounts of sulfuric acid or of oleum having a very low concentration of $SO_3$.

It has now been found that, for the first time, the possibility exists of also being able to carry out the exothermic cyclisation reaction with highly concentrated oleum by the simultaneous addition of diarylaminobenzoquinones and oleum.

Accordingly, the present invention relates to a process for the preparation of triphendioxazines by oxidising cyclisation of 2,5-diarylamino-1,4-benzoquinones with oleum and other optional oxidising agents and/or catalysts, which process comprises charging said 2,5-diarylamino-1,4-benzoquinones and oleum simultaneously to a reactor.

This novel process permits the consumption of sulfuric acid to be very nearly halved, and therefore also the amount of base added to neutralise the sulfuric acid and the waste salt formed during the neutralisation. Further advantages of the process of this invention are the possibility of a continuous mode of operation, a higher space/time yield, and a higher concentration of active substance in the final product.

A preferred embodiment of the invention comprises
(a) charging the reactor with 100% sulfuric acid or oleum,
(b) introducing (1) oleum and (2) a 2,5-diarylamino-1,4-benzoquinone in separate streams, simultaneously and continuously, into the oleum present in the reactor and mixing the components, the oleum which is added having a higher concentration of $SO_3$ than the oleum already present in the reactor,
(c) keeping the reaction mass in the temperature range from 30° to 70° C. by cooling, and
(d) isolating the resultant triphendioxazine in conventional manner.

Preferably, the $SO_3$ concentration of the oleum already present in the reactor can be up to 40%, whereas the $SO_3$ concentration of the oleum subsequently added is preferably from 60 to 80%.

The diarylaminobenzoquinones suitable for use in the process of this invention are known or can be obtained by known methods. (Reference is made in this connection to the publications cited above).

Representative compounds are those of formula

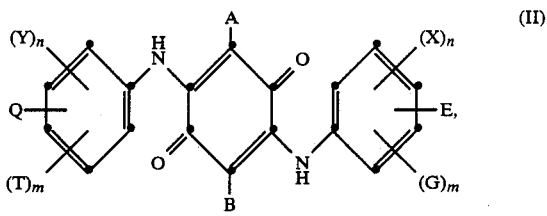
(II)

wherein A and B are each hydrogen, halogen, unsubstituted or substituted $C_1$-$C_4$alkyl, NH—COalkyl, NH—COaryl, $C_1$-$C_4$alkoxy, aryl or O—aryl, X and Y are each —$SO_3H$, —COOH, —$SO_2$—R$[N(R,R)]_p$, —$SO_2$—NH—$CO_2$—R, —$SO_2$—$N(R_1R_2)$ or —CO—$N(R_1R_2)$, R is unsubstituted or substituted $C_1$-$C_6$alkyl, aralkyl, aryl, —CH=$CH_2$ or —CH—$CH_2$—W, wherein W is a radical which can be removed to form the —CH=$CH_2$ group, for example —$OSO_3H$ or —$SSO_3H$, $R_1$ and $R_2$ are each hydrogen, unsubstituted or substituted $C_1$-$C_6$alkyl, aralkyl or aryl, E and Q are each hydrogen, –(L—Z)$_p$$N(R_4R_5)$, in which L is —N—$R_3$, —O— or —S—, and Z is unsubstituted or substituted $C_1$-$C_6$alkyl, cycloalkyl, aryl, $C_3$-$C_4$alkylene, cyclohexylene, or a group in which —N($R_3$)—Z—N($R_4$) form a 1,4-piperazindiyl ring, $R_3$, $R_4$ and $R_5$ are each hydrogen, unsubstituted or substituted $C_1$-$C_4$alkyl, cuclopentyl, cyclohexyl or aryl, G and T are each halogen, $C_1$-$C_4$alkyl, $C_1$-$C_4$alkoxy or carboxy,
n is 0 to 4,
m is 0 to 3, and
p is 0 or 1.

In formula II, A and B are preferably hydrogen or halogen, R is preferably methyl, ethyl, propyl, phenyl, —CH=$CH_2$ or —$CH_2$—$CH_2$—W, in which W is as defined above, $R_1$ and $R_2$ are preferably hydrogen, methyl, ethyl, propyl, phenyl, —CH=$CH_2$ or —$CH_2$—$CH_2$—W, wherein W is as defined above, Z is preferably $C_1$-$C_6$alkyl, cycloalkyl, aryl, $C_3$-$C_7$alkylene, cyclohexylene or a group in which —N($R_3$)ZN($R_4$) is a 1,4-piperazindiyl ring, and $R_3$, $R_4$ and $R_5$ are preferably hydrogen, $C_1$-$C_4$alkyl, cyclopentyl, cyclohexyl or aryl.

it is particularly preferred to use compounds of formula

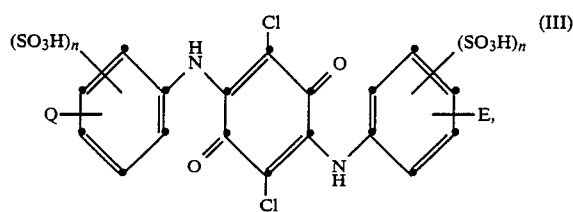

wherein E, Q and n are as defined above; and, most preferably, compounds of formula

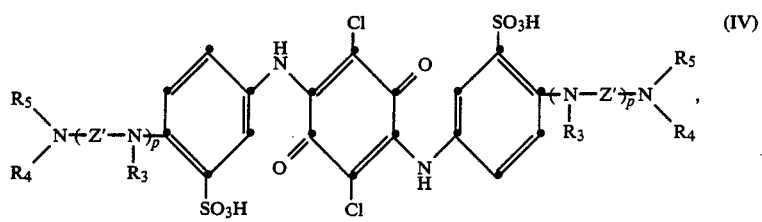

wherein $Z'$ is phenyl, substituted phenyl, $C_1$–$C_6$alkyl or $C_3$–$C_7$cycloalkyl, and p is 0 or 1, and $R_3$, $R_4$ and $R_5$ are hydrogen, unsubstituted or substituted $C_1$–$C_4$alkyl, cyclopentyl, cyclohexyl or aryl.

The diarylaminobenzoquinones can be symmetrically as well as unsymmetrically substituted. In particular, additional $SO_3H$ groups can be introduced during the cyclisation.

The oleum to be charged to the reactor and acting as oxidising agent contains free $SO_3$ preferably in a concentration of 30–80%, most preferably 60–80%. If oleum is charged to the reactor, as for example in batchwise operation, then the concentration of $SO_3$ therein should preferably be up to 40%. It is, however, also possible to use 100% sulfuric acid.

Catalysts such as iodine or iodine compounds may be mixed with the oleum which is present in, or which is to be added to, the reactor.

The ratio of $SO_3$ to diarylaminobenzoquinone of formula II should preferably be a ratio of 1 to 5 parts, most preferably 1 to 3 parts, of $SO_3$ per part of diarylaminobenzoquinone. The amount of $SO_3$ can also be partially replaced by other oxidising agents such as sodium, potassium or ammonium peroxide disulfate, manganese dioxide, permanganate, arsenic acid or organic peroxides.

It is preferred to add the diarylaminobenzoquinone in solid form to the reaction medium.

The process of this invention can be carried out batchwise and continuously. In the continuous procedure, it is possible to use the customary reactors for the purpose, for example tube reactors, screw reactors, kneaders, or continuously operating agitator vessels or cascades in which the reaction mass is constantly discharged.

The simultaneous addition of oleum and the diarylaminobenzoquinone is preferably made in the temperature range from 30°–100° C., most preferably from 40°–80° C., to a reactor which-in batchwise operation-may contain reaction mass from a previous batch.

A further preferred embodiment of the process of the invention comprises introducing a compound of formula

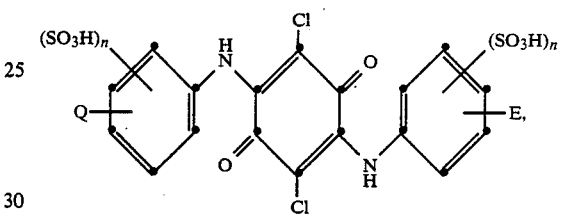

wherein E, Q and n have the given meanings, simultaneously with 60–80% oleum in an amount corresponding to a ratio of 1 to 3 parts of $SO_3$ per part of compound of formula III, into a reactor that contains oleum having a $SO_3$ concentration of 20–40%, and reacting the components together in the temperature range from 40° to 80° C.

Conventional working up, i.e. pouring the reaction mass on to ice and adjusting the pH of the resultant mixture to 1.2–2.4 with, for example, a solution of sodium hydroxide, affords a product of high concentration in good yield. This product can be processed direct to reactive dyes, for example by reaction with cyanuric derivatives.

The invention is illustrated by the following non-limitative Examples, in which parts and percentages are by weight.

EXAMPLE 1

A mixture of 450 parts of 25% oleum and 150 parts of 66% oleum is charged to a stirred reactor and warmed to 30° C. With stirring, 275 parts of the solid diarylaminobenzoquinone of formula

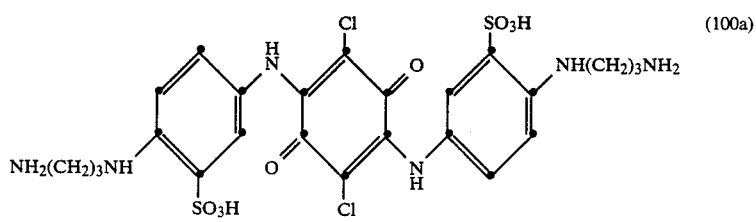

and 675 parts of 66% oleum are added to the above mixture simultaneously over 4 hours. The temperature is kept in the range from 40°–60° C. during the addition of the reactants by cooling the reactor. The reaction mass is thereafter stirred for 1 hour at 50°-60° C., cooled to 20° C., and poured on to 3000 parts of ice. The pH is adjusted to 1.5 with sodium hydroxide solution and the precipitated triphendioxazine is isolated by filtration. The chromophore of formula

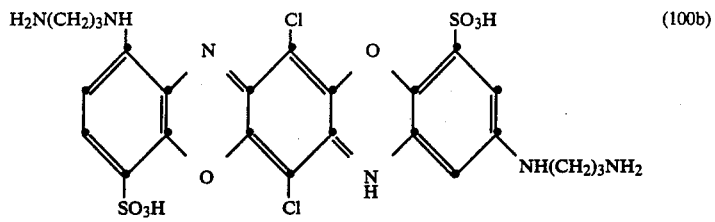
(100b)

obtained in 88% yield is reacted direct in accordance with European patent application A-101 665 to give a dye which colours cellulose in pure blue shades.

The amount of waste (salt+organic by-products) formed is 7.8 parts per part of product.

The amount of waste is 16.5 parts in a process with non-simultaneous addition of reactants as disclosed in EP-A 101 665.

EXAMPLE 2

In a stirred reactor, 600 parts of 12% oleum are preheated to 40° C. and 275 parts of the compound of formula

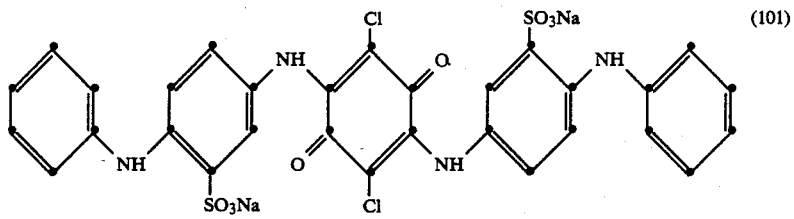
(101)

and 700 parts of 66% oleum are added simultaneously over 4 hours, while keeping the temperature at 50° C. After stirring for 1 hour at the same temperature, the reaction mass is cooled and poured into ice-water, whereupon the temperature rises to 100°-105° C. The reaction mixture is stirred for a further 2 hours at this temperature, then cooled and filtered. The pH is adjusted to 1.5 with NaOH and the product is isolated by filtration, washed and dried, affording a direct dye in 80% yield which dyes cotton and paper in blue shades.

EXAMPLE 3

The procedure of Example 1 is repeated, except that the addition is made over 4 hours in a constant temperature range from 47°-50° C., or over 10 hours in a constant temperature range from 40°-44° C. The yield of chromophore is 87% and 85%, respectively.

EXAMPLE 4

The procedure of Example 1 is repeated, except that 720 parts of 29% oleum are initially charged to the reactor and 555 parts of 80% oleum are introduced in the simultaneous addition. The chromophore is obtained in a yield of 89%.

EXAMPLE 5

550 parts of the compound of formula (100a) and 600 parts of 66% oleum are added simultaneously dropwise over 2 hours at 55°-58° C. to a stirred reactor containing 600 parts of 38% oleum. Further processing is effected in accordance with Example 1. The yield of chromophore is 88%.

EXAMPLE 6

275 parts of the compound of formula (100a) and 675 parts of 66% oleum are added simultaneously, under isothermic conditions, at 44° C. over 4 hours to a mixture of 450 parts of 25% oleum and 150 parts of 66% oleum. During this addition, the reaction mixture is circulated continuously through a heat exchanger. The reaction mixture is subsequently kept for 2 hours at 50° C. and worked up as described in Example 1. The yield of chromophore is 90%.

EXAMPLE 7

6 parts/min of the chloroanil condensate of formula (100a) and 24 parts/min of 66% oleum are fed continuously at a temperature of 50° C. above the surface into a 1 liter stirred straight-through reactor containing 600 parts of a final reaction mass obtained as described in Example 1. Simultaneously, 30 parts/min of the reaction mass are drawn off from the bottom outlet and fed at 60° C. into a second stirred straight-through reactor containing 600 parts of final reaction mass. The continuous discharge of 30 parts/min from the second reactor can be worked up batchwise or also continuously by dilution with ice-water and subsequent neutralisation as in Example 1. The average residence time in each reactor is 20 minutes. After about 2 hours a steady-state operation of the reactor cascade is attained. The yield of chromophore is 90%.

What is claimed is:

1. A process for the preparation of a triphendioxazine by oxidising cyclisation of a 2,5-diarylamino-1,4-benzoquinone with oleum and further optional oxidising agents and/or catalysts, which process comprises charging a reactor simultaneously with the 2,5 diarylamino-1,4-benzoquinone and oleum.

2. A process according to claim 1, which comprises
   (a) charging the reactor with 100% sulfuric acid or oleum,
   (b) introducing (1) oleum and (2) a 2,5-diarylamino-1,4-benzoquinone in separate streams, simultaneously and continuously, into the oleum present in the reactor and mixing the components, the oleum which is added having a higher concentration of SO₃ than the oleum already present in the reactor, (c) keeping the reaction mass in the temperature range from 30° to 70° C. by cooling, and (d) isolating the resultant triphendioxazine in conventional manner.

3. A process according to claim 2, wherein the SO₃ concentration of the oleum present in the reactor is up to 40% and the SO₃ concentration of the oleum added to the reactor is from 60 to 80%.

4. A process according to claim 1, which comprises the use of a 2,5-diarylamino-1,4-benzoquinone of formula

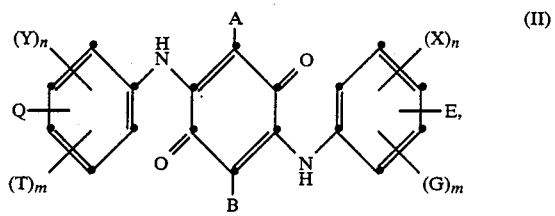

wherein

A and B are each hydrogen, halogen, unsubstituted or substituted $C_1$-$C_4$alkyl, NH—COalkyl, NH—COaryl, $C_1$-$C_4$alkoxy, aryl or O—aryl, X and Y are each —SO₃H, —COOH, —SO₂—N(R,R)$_p$, —SO₂NH—CO₂—R, —SO₂—N(R₁R₂) or —CO—N(R₁R₂), R is unsubstituted or substituted $C_1$-$C_6$alkyl, aralkyl, aryl, —CH=CH₂ or —CH—CH₂—W, wherein W is a radical which can be removed to form the —CH=CH₂ group, R₁ and R₂ are each hydrogen, unsubstituted or substituted $C_1$-$C_6$alkyl, aralkyl or aryl, E and Q are each hydrogen, (L—Z)$_p$N(R₄R₅), in which L is —N—R₃, —O— or —S—, and Z is unsubstituted or substituted $C_1$-$C_6$alkyl, cycloalkyl, aryl, $C_3$-$C_4$alkylene, cyclohexylene, or a group in which —N(R₃)—Z—N(R₄) form a 1,4-piperazindiyl ring, R₃, R₄ and R₅ are each hydrogen, unsubstituted or substituted $C_1$-$C_4$alkyl, cyclopentyl, cyclohexyl or aryl, G and T are each halogen, $C_1$-$C_4$alkyl, $C_1$-$C_4$alkoxy or carboxy, n is 0 to 4, m is 0 to 3, and p is 0 or 1.

5. A process according to claim 4 wherein W is —OSO₃H or —SSO₃H.

6. A process according to claim 4, which comprises the use of a 2,5-diarylamino-1,4-benzoquinone of formula II, wherein A and B are hydrogen or halogen, R is methyl, ethyl, propyl, phenyl, —CH=CH₂ or —CH₂—CH₂—W, in which W is as defined in claim 4, R₁ and R₂ are hydrogen, methyl, ethyl, propyl, phenyl, —CH=CH₂ or —CH₂—CH₂—W, in which W has the given meaning, Z is $C_1$-$C_6$alkyl, cycloalkyl, aryl, $C_3$-$C_7$alkylene, cyclohexylene or a group in which —N(R₃)ZN(R₄) forms a 1,4-piperazindiyl ring, and R₃, R₄ and R₅ are hydrogen, $C_1$-$C_4$alkyl, cyclopentyl, cyclohexyl or aryl.

7. A process according to claim 1, wherein the reaction temperature during the addition is in the range from 30° to 100° C.

8. A process according to claim 5, wherein the reaction temperature is in the range from 40° to 80° C.

9. A process according to claim 1, wherein 30-80% oleum is used.

10. A process according to claim 9, wherein 60 to 80% oleum is used.

11. A process according to claim 1, wherein 1 to 5 parts of SO₃ are used per part of 2,5-diarylamino-1,4-benzoquinone.

12. A process according to claim 1, wherein 1 to 3 parts of SO₃ are used per part of 2,5-diarylamino-1,4-benzoquinone.

13. A process according to claim 2, which comprises (a) charging the reactor with 20-40% oleum, (b) introducing (1) oleum and (2) a 2,5-diarylamino-1,4-benzoquinone of the formula

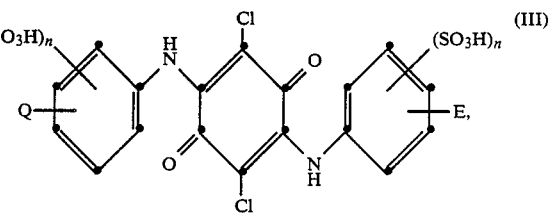

wherein E and Q are each hydrogen, (LZ)$_p$N(R₄R₅), in which L is —NR₃—, —O— or —S— and Z is unsubstituted or substituted $C_1$-$C_4$alkyl, cycloalkyl, aryl, $C_3$-$C_4$alkylene, cyclohexylene, or a group in which —N(R₃)—Z—N(R₄) form a 1,4-piperazindiyl ring, R₃, R₄ and R₅ are each hydrogen, unsubstituted or substituted $C_1$-$C_4$alkyl, cyclopentyl, cyclohexyl or aryl, and n is 0 to 4, in separate streams, simultaneously or continuously, into the oleum present in the reactor and mixing the components, the oleum which is added having a concentration of 60-80% and being used in an amount corresponding to a ratio of 1 to 3 parts of SO₃ per part of compound of formula (III), (c) keeping the reaction mass in the temperature range from 30° to 70° C. by cooling, and (d) isolating the resultant triphendioxazine in conventional manner.

* * * * *